United States Patent [19]

Vähätalo et al.

[11] Patent Number: 5,737,410
[45] Date of Patent: Apr. 7, 1998

[54] METHOD FOR DETERMINING THE LOCATION OF ECHO IN AN ECHO CANCELLER

[75] Inventors: Antti Vähätalo; Jorma Mäkinen, both of Tampere, Finland

[73] Assignee: Nokia Telecommunication Oy, Espoo, Finland

[21] Appl. No.: 666,412

[22] PCT Filed: Dec. 21, 1994

[86] PCT No.: PCT/FI94/00577

§ 371 Date: Sep. 13, 1996

§ 102(e) Date: Sep. 13, 1996

[87] PCT Pub. No.: WO95/17784

PCT Pub. Date: Jun. 29, 1995

[30] Foreign Application Priority Data

Dec. 23, 1993 [FI] Finland .................. 935834

[51] Int. Cl.⁶ .................. H04B 3/20; H04B 3/23
[52] U.S. Cl. .................. 379/410; 379/406; 379/411; 370/286; 370/290; 370/291
[58] Field of Search .................. 379/347, 349, 379/402, 403, 404, 406, 410, 411; 370/286, 287, 288, 289, 290, 291; 364/724.19

[56] References Cited

U.S. PATENT DOCUMENTS

| | | | |
|---|---|---|---|
| 4,468,641 | 8/1984 | Duttweiler et al. | 333/166 |
| 4,491,701 | 1/1985 | Duttweiler et al. | 364/724.19 |
| 4,562,312 | 12/1985 | Duttweiler | 370/290 |
| 4,577,309 | 3/1986 | Barazeche et al. | 370/286 |
| 4,582,963 | 4/1986 | Danstrom | 379/411 |
| 4,587,382 | 5/1986 | Yang | 370/291 |
| 4,591,669 | 5/1986 | Duttweiler et al. | 370/291 |
| 4,593,161 | 6/1986 | Desblache et al. | 379/377 |
| 4,607,363 | 8/1986 | Platel et al. | 370/230 |
| 4,645,884 | 2/1987 | Barazeche et al. | 379/406 |
| 4,751,730 | 6/1988 | Galand et al. | 379/410 |
| 4,764,955 | 8/1988 | Galand et al. | 379/411 |
| 4,823,382 | 4/1989 | Martinez | 379/411 |
| 4,991,166 | 2/1991 | Julstrom | 370/288 |
| 5,343,522 | 8/1994 | Yatrou et al. | 379/410 |

FOREIGN PATENT DOCUMENTS

| | | |
|---|---|---|
| 0 199 879 | 11/1986 | European Pat. Off. . |
| 221221 | 5/1987 | European Pat. Off. . |
| 0 375 015 | 6/1990 | European Pat. Off. . |
| 557829 | 9/1993 | European Pat. Off. . |
| 2 135 558 | 8/1984 | United Kingdom . |
| 88/07792 | 10/1988 | WIPO . |

*Primary Examiner*—Harry S. Hong
*Assistant Examiner*—Scott Wolinsky
*Attorney, Agent, or Firm*—Cushman Darby & Cushman IP Group of Pillsbury Madison & Sutro LLP

[57] ABSTRACT

A method for adaptation to an echo location in an echo canceller comprising an output port, an input port, an adjustable delay unit (43) compensating for the pure delay component in the echo path between the echo location and the output port of the echo canceller, a digital filter (40) calculating, from a signal outgoing to the echo path, an echo location estimate which is shorter than the maximum allowed duration of the echo path. The echo location is determined by calculating the echo path location at which there is a high correlation between the signal outgoing to the echo path and the returned echo. The correlation is calculated in a sliding window having the length of the digital filter.

7 Claims, 4 Drawing Sheets

PRIOR ART

FIG. 2

PRIOR ART

METHOD FOR DETERMINING THE LOCATION OF ECHO IN AN ECHO CANCELLER

This application is the National Stage Application of PCT Application Ser. No. PCT/FI94/00577 filed Dec. 21, 1994.

FIELD OF THE INVENTION

The invention relates to a method for adaptation to an echo location in an echo canceller comprising an output port, an input port, an adjustable delay unit compensating for the pure delay component in the echo path between the echo location and the output port of the echo canceller, a digital filter calculating, from a signal outgoing to the echo path, an estimate for the echo location which is shorter than the maximum allowed duration of the echo path.

BACKGROUND OF THE INVENTION

In end-to-end connections in a data transmission system, such as a telephone network, long propagation delays are often encountered. Consequently, an echo will be perceived for instance in the case of normal speech when the signal is reflected back from the far end of the connection to the speaker.

Two main factors contribute to the generation of echo: acoustic echo between the earphone and microphone of a telephone set, and electrical echo generated in the transmission systems for the transmit and receive directions of the connection.

Hybrid circuits (two-wire to four-wire transformers) located at terminal exchanges or in remote subscriber stages of a fixed network are the principal sources of electrical echo. Subscriber lines in a fixed network are normally two-wire lines for reasons of economy. Interexchange lines, on the other hand, are four-wire lines.

Figure 1:
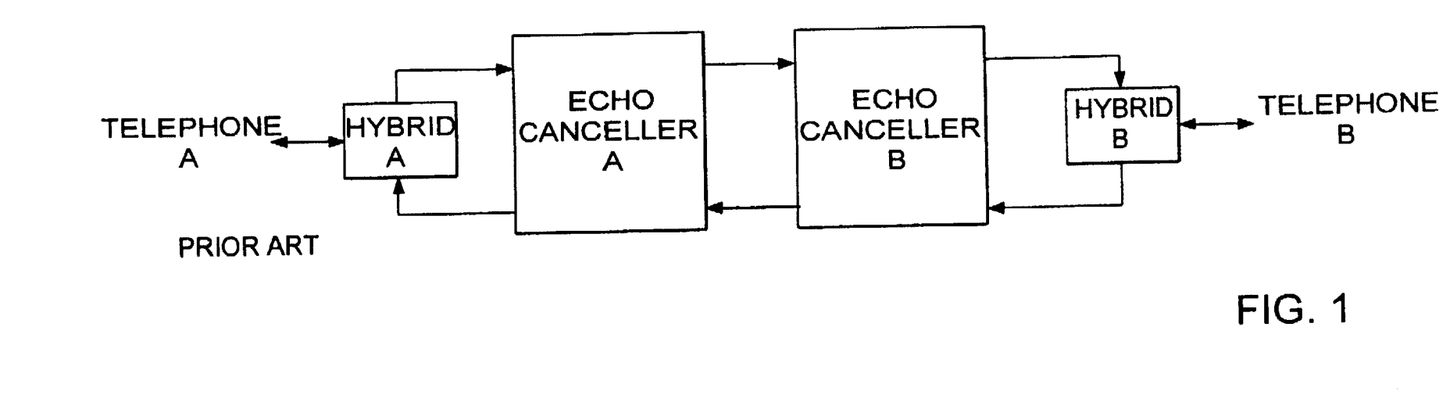
FIG. 1 is a schematic block diagram of a data transmission system employing echo cancellation.

CCITT recommendation G.131 specifies echo tolerance graphs taking into account the ratio between the echo level and the delay. In practice, it has been found that all connections having an unidirectional delay in excess of 20 ms require an echo cancelling mechanism to reduce the level of echo. The block diagram of FIG. 1 illustrates a transmission system requiring echo cancellation. In FIG. 1, hybrid B causes the speech of speaker A to be transmitted back as echo which is cancelled by an echo canceller B. Correspondingly, hybrid A causes the speech of speaker B to be transmitted back as echo which is cancelled by an echo canceller A.

An echo canceller is a signal processing device, e.g. a device processing speech signals, employed for reducing echo by subtracting an echo estimate from the echo (signal) present in the connection. The echo canceller may be either digital or analog. Today echo cancelling devices are implemented with digital signal processing, thus enabling modelling echo paths having very long propagation delays. Since the echo path is in principle different in each call situation, it is necessary to employ in the echo canceller a method that always adapts to a new echo path at the beginning of the call. Digital signal processing offers an adaptive filter as a solution to this problem. When a signal is present or the signal level is sufficient, adaptation is initiated in which the filter coefficients are updated on the basis of the correlation of the speech signal and the returned echo signal.

Figure 2:
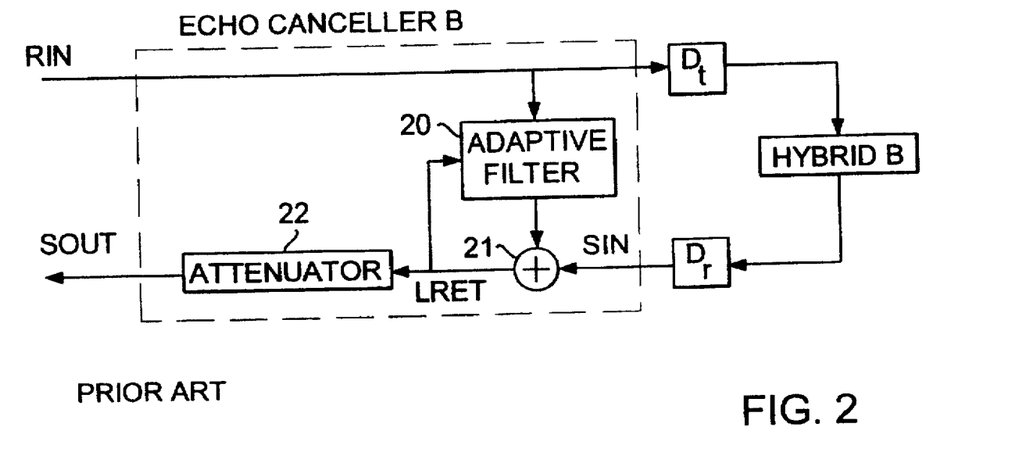
FIG. 2 is a block diagram of a known echo canceller.

FIG. 2 shows a solution of this kind for embodying the echo canceller B of FIG. 1. A speech signal RIN received from speaker A is transmitted as such to hybrid B; the signal SIN from the hybrid includes an echo of the speech of speaker A. An adaptive filter 20 calculates an estimate for this echo; the estimate is added in a summer 21 to the signal SIN received from hybrid B in reverse phase, so that the remaining signal LRET only comprises the speech signal of speaker B. Furthermore, the echo canceller B incorporates an attenuator 22 with which the residual echo is attenuated. This means that the signal LRET is attenuated when there is sufficient certainty that the signal SIN from the hybrid B only comprises the echo of the speech of speaker A and no speech of speaker B.

In echo cancellers, adaptive filters 20 must in principle have a length covering the delay in the entire echo path. It is to be noted that a considerable delay may exist between the echo canceller B and the hybrid B; such a delay is illustrated by delay blocks $D_t$ and $D_r$ in FIG. 2. Thus the delay ($D_e$) over the echo path is $$D_e = D_t + D_r$$

where $D_t$ = delay from echo canceller B to hybrid B
$D_r$ = delay from hybrid B to echo canceller B Thus the impulse response in the entire echo path is $$D = D_e + D_{hybrid}$$

where $D_{hybrid}$ = impulse response of hybrid B.

Figure 3:
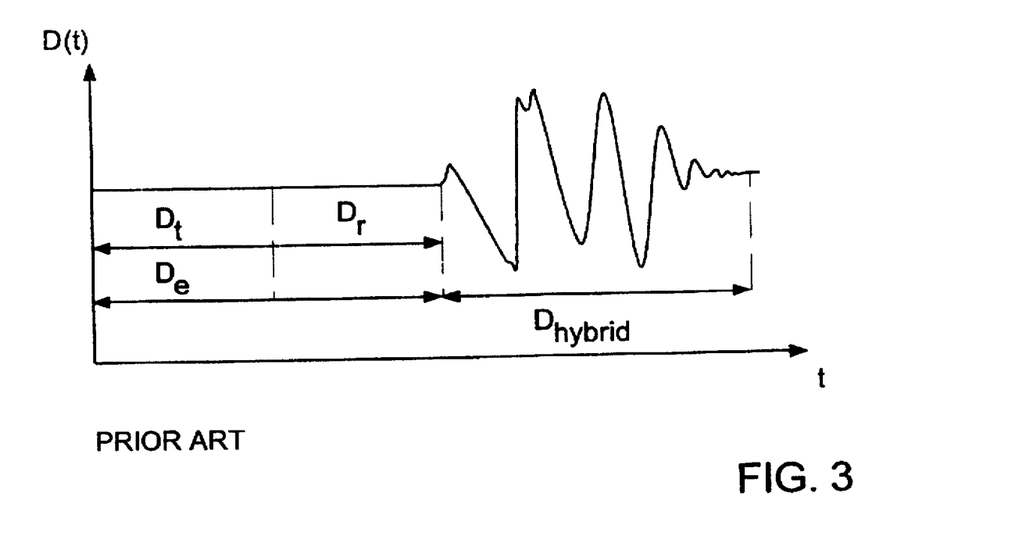
FIG. 3 shows the impulse response of the echo path.

FIG. 3 illustrates an impulse response in an echo path, showing the pure delay component $D_e$ and the echo location $D_{hybrid}$. As stated previously, an adaptive filter must be capable of processing the echo in the delay range of the entire echo path. This entails filters with long time intervals, which will again involve a large number of filter coefficients that must be calculated and updated on a regular basis. This requires a lot of computing capacity and results in slower filter adaptation and a less accurate filter. The memory capacity and computing capacity required by the filters is almost directly proportional to the length of the filter. Particularly calculating the cross correlation of the signal outgoing to the echo path and the incoming signal returned therefrom requires a lot of computing capacity. In calculating direct cross correlation, a sample returned from the echo path during each sample interval is compared with M samples outgoing to the echo path, and M cross correlation estimates are updated. A maximum delay of M=512 samples over the echo path requires a large number of calculations to be performed.

To overcome this problem, European Patent Specification 0 199 879 discloses an echo cancellation method in which the echo location is determined at the beginning of the call. This is implemented by employing a training signal. The digital filter of the echo canceller approximates only this particular echo location, and thus a shorter filter can be employed.

Also European Patent Specification 0 375 015 discloses an echo canceller in which the tap coefficients of a short transversal filter are calculated to approximate only the significant echo component without the pure delay component. The delay over the echo path is determined at the beginning of the call, but no method for performing this operation is disclosed in the application.

In U.S. Pat. No. 4,823,382, tap coefficients of a digital filter are only calculated at significant echo locations; at other locations, the tap coefficients are set to zero.

British published application 2 135 558 discloses an echo canceller incorporating an adjustable delay connected in series with a short filter and compensating for a constant delay in the echo path. The object is to find the delay location in the echo path in such a way that a minimum of computing capacity is required. The peak load required during cross correlation has been reduced by low-pass filtering and decimating the incoming and outgoing signals in the echo path that are applied to the calculation of the cross correlation. In other words, this prior art approach employs subsampling. If the decimation ratio DS=8, the above maximum delay in the echo path as found by calculating the linear correlation is M=512/8=64. The required number of calculations decreases in the same ratio. However, this prior art method only deals with the lowest 500 Hz frequency band of the initial echo signal.

Also in European Patent Application 0 221 221 an adjustable delay is coupled ahead of a short echo canceller. In determining the delay over the echo path, the number of calculations required in the cross correlation has been reduced by decimating the signals applied to the calculation of the cross correlation in such a way that the sampling interval is 2 milliseconds instead of 125 microseconds. Instead of mere subsampling, the powers of the initial signals for a time interval of 2 milliseconds are applied to the calculation of the cross correlation. Decimation diminishes the accuracy of the delay estimate. Furthermore, using power instead of the initial signal impairs the performance of the algorithm, particularly if the echo signal is mixed with near-end speech or background noise.

In data modems, the location of the delay in the echo path is determined by using training signals. This known solution has, however, found no application in echo cancellers of other equipment than data modems, since it is difficult to determine the location of the delay from a speech signal. The location of the delay must be determined at the beginning of the call rapidly and reliably from the mere speech signal.

DISCLOSURE OF THE INVENTION

It is an object of the present invention to enable alignment of the adaptive filter of an echo canceller to a location of echo by using a mere speech signal. The method of the invention is also operative with other signals, such as noise or signalling tones.

The adaptive filter is aligned to the echo location by the method disclosed in the preamble, which is characterized in accordance with the invention in that the method comprises the steps of a) taking N samples of the speech signal outgoing to the echo path, and storing them in memory, b) taking N samples of a signal incoming from the echo path, and storing them in memory, c) calculating the correlation between the stored N samples of the outgoing signal and the stored N samples of the incoming signal, d) taking a new sample of the signal incoming from the echo path and deleting from memory the oldest sample, N of the latest samples of the incoming signal being stored, e) repeating steps c) and d) M times, which corresponds to at least the combined length of the longest allowed time interval of said delay and the actual echo location, f) determining the center of echo on the basis of the calculated correlations, g) determining, on the basis of the calculated correlation values, whether the delay location has been found with sufficient certainty, and if not, returning to step a), h) adjusting the delay of said delay means in such a way that the digital filter is centred to the center of echo thus determined.

In the present invention, the peak load required for calculating the cross correlation is reduced without any throughput-diminishing decimation by distributing the calculation over a longer time interval, thus permitting the computing load during each sampling interval to remain comparatively small. N samples of the speech signal outgoing to the echo path are stored in memory in a first vector and N samples of the incoming speech signal from the echo path in a second vector. Hereafter the correlation between the samples taken from the incoming and outgoing signal is calculated. The content of the first vector remains constant all the time, but the second vector is updated so that N latest returned samples are stored in memory in each case. In other words, when a new sample of the incoming signal is obtained, the sample is stored and the oldest sample is deleted, and thus N latest samples of the incoming signal are in store in each case. After storing of a new sample, calculation of the correlation is repeated, until the calculation has been executed M times. This gives a set of correlation values from which the location at which the correlation is highest is determined on the assumption that the center of echo is located at this point. The center of echo is determined by calculating the sums of squares of a few successive (for example 8) correlation results into a sum vector wherefrom the highest sum of a few (for example 8) elements is sought. Hereafter the correlation results that made up the highest sum are set to zero in the sum vector, and the sums of respective squares of a few correlation results are further calculated. Since the correlation results that initially gave the highest sum have been set to zero, the new maximum sum will be at a different location that the first one. The center of echo is presumed to be at the location of the correlation results that first gave the highest sum, if the first sum is sufficiently higher than the second sum. If the ratio between the first and second sum is not sufficiently high, correlation of the outgoing and incoming signals is continued. When the adaptive filter of the echo canceller has been centred in the echo range by setting the delay in the delay unit to the determined value, the procedure passes to calculating the coefficients for the adaptive filter to adapt the filter to the echo signal.

BRIEF DESCRIPTION OF THE DRAWINGS

In the following the invention will be explained in further detail by means of illustrating embodiments with reference to the accompanying drawings, in which.

PREFERRED EMBODIMENTS OF THE INVENTION

Figure 4:
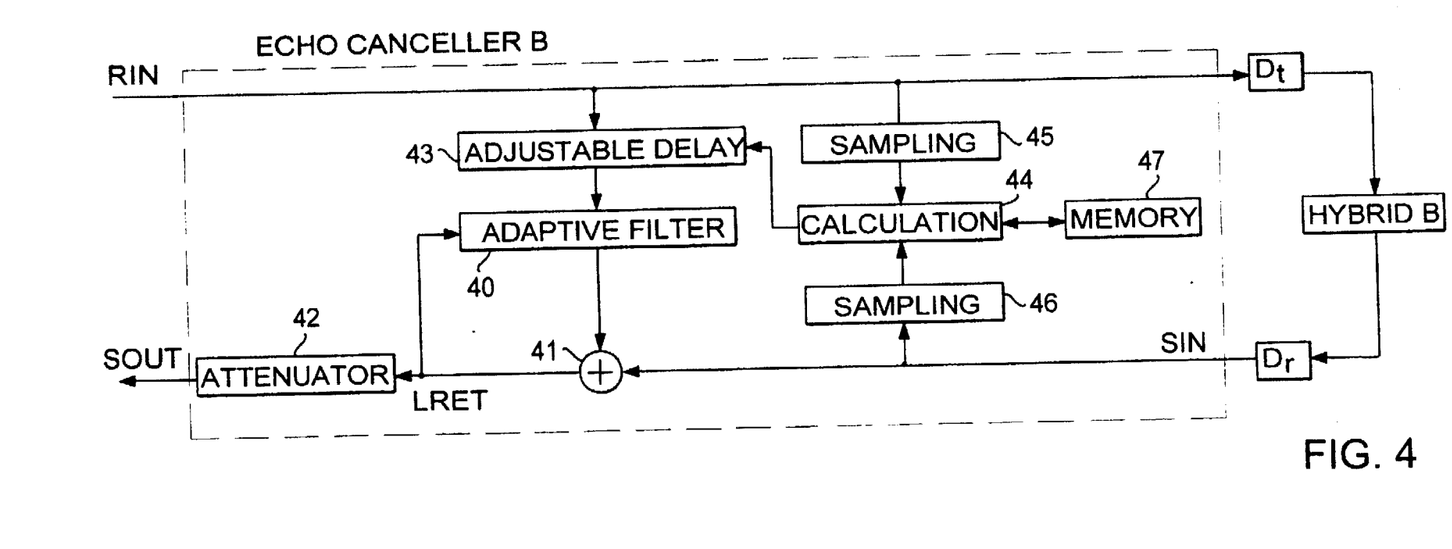
FIG. 4 is a block diagram of an echo canceller of the invention.

FIG. 4 is a block diagram of an echo canceller of the invention. The operation of an echo canceller in accordance with FIG. 4 will be described below in a case where it serves as echo canceller B shown in FIG. 1. Thus the echo canceller of FIG. 4 receives a speech signal from speaker A at port RIN and transmits it as such to the echo path and to hybrid B, which is at the remote end seen from speaker A. A speech signal and a portion of the speech signal from speaker A reflected from hybrid B, i.e. an echo signal, are received from speaker B at port SIN of echo canceller B. The speech signal of speaker A received at port RIN is passed via an adjustable delay 43 to an adaptive filter 40, which derives an echo estimate therefrom. This echo estimate is summed together with the signal received at port SIN in reverse phase by summer 41. Thus the echo estimate and the actual echo signal at least partially cancel each other, and the level of echo in the output signal LRET of summer 41 is decreased. The signal LRET is supplied via attenuator 42 to output port SOUT, wherefrom the signal is transmitted to speaker A. Thus speaker A will hear the speech of speaker B but not the disturbing remote-end echo of his own speech. The adaptive filter 40 may be an adaptive digital filter based on a prescribed algorithm. The echo path varies from one connection and speech situation to another. Thus, when the speech signal arrives at port RIN of the echo canceller, the echo canceller must adapt itself in a comparatively short time to the new echo path by determining a model of the echo path (transfer function of filter 40), which will be employed to generate an echo estimate. The coefficients of filter 40 are updated on the basis of the correlation between the speech signal outgoing to the echo path and the echo signal returned from the echo path to port SIN; the correlation is calculated in filter 40. As is illustrated in connection with FIG. 3, the echo path may be represented generally by the impulse response, which typically consists of pure delay $D_e$ and an echo signal. The sum of these components is the total impulse response of the echo path. For example in accordance with GSM recommendation 3.50, the maximum delay may have values up to 60 ms but the maximum allowed spreading of the signal, i.e. the impulse response of the hybrid, is 16 ms. In the invention, the length of adaptive filter 40 is selected to span the range in which echo is encountered. This enables a 16 ms filter having 128 coefficients to be used (the present-day telephone systems employ a sampling frequency of 8000 Hz, and thus the number of coefficients is 16 ms * 8000 Hz=128), whereas modelling the entire echo path would require a 60 ms filter having 480 coefficients. When an adjustable delay is employed ahead of the adaptive filter, a delay value for delay unit 43 enabling adaptive filter 40 to be centred to the location of echo produced by the hybrid is calculated at the beginning of the call. This is followed by the adaptation of adaptive filter 40 to the echo signal, i.e., calculation of the filter coefficients. At this stage, adaptive filter 40 cancels echo in a window that shall have a length at least equal to the length of the echo range $D_{hybrid}$.

For determining the delay component of the echo path, echo canceller B incorporates sampling means 45 and 46 for sampling signals RIN and SIN and a calculation unit 44 calculating the correlations between signals RIN and SIN employing the samples taken and storing them in memory 47. Thereafter calculation unit 44 analyses the calculated correlations and determines the echo location on the basis of them.

In the following, the delay search procedure and setting of adaptive filter 40 to the echo location will be described. The delay location is determined at the beginning of the call after the speech has started, by utilizing a speech signal (the method of the invention is also operative with other signals, but for clarity it is assumed that the signal is a speech signal), i.e. signals RIN and SIN.

A search procedure in accordance with the preferred embodiment of the invention will now be explained with reference to the flow diagram of FIGS. 5A and 5B.

In step 51, information on the start of a call is obtained from a telephone exchange, as a result of which the variables employed in the delay search procedure are initialized, for instance vector CORR and level counter Level RIN are set to zero and the delay search is initiated.

First, in step 52 sampling circuit 45 takes samples of signal RIN, N (N is e.g. 128) latest samples being stored in memory at each moment. Likewise, sampling circuit 46 takes samples of signal SIN, N latest SIN samples being stored in memory at each moment. Calculation circuit 44 calculates the level of signal RIN on the basis of the RIN samples taken, in accordance with the equation for Level_ RIN (1) in step 53.

$$\text{Level\_RIN} = \text{gain} * \text{Level\_RIN} + (1-\text{gain}) * |\text{RIN}(i)| \quad (1)$$

where gain is constant, e.g. 0.992

|RIN(1)|=absolute value of RIN(1)

RIN(1) is the latest stored value of signal RIN.

In step 54, the calculated level of signal RIN is compared to a predetermined threshold value, e.g. -35 dBm0 (the unit dBm0 is specified in CCITT Recommendation G.711). If Level_RIN does not exceed the threshold value, it is presumed that the signal does not comprise any speech yet, and thus the procedure returns to step 52. When Level_RIN exceeds the preset threshold value, it can be presumed that signal RIN comprises speech, and thus the procedure passes to step 55. In step 56, calculation circuit 44 calculates the level of signal SIN, which can be performed using formula (2)

$$\text{Level\_SIN} = \sum_{i=1}^{N} SIN(i) * RIN(i) \quad (2)$$

In step 57, calculation circuit 44 calculates the correlation C between the RIN and SIN samples stored in memory in accordance with equation (3).

$$C = \sum_{i=1}^{N} SIN(i) * RIN(i) \quad (3)$$

In step 58, the correlation calculated from equation (3) is divided with the levels of signal RIN and signal SIN in accordance with equation (4), which gives a scaled correlation C'.

$$C' = \frac{C}{\text{Level\_RIN} * \text{Level\_SIN}} \quad (4)$$

In step 59, the correlation result C' obtained from equation (4) is stored in vector CORR in accordance with equation (5)

$$\text{CORR}(n) = a * \text{CORR}(n) + (1-a) * C \quad (5)$$

where a is constant, e.g. 0.875.

In step 60 it is checked whether steps 57–59 have been repeated for the delay range of the entire echo path, i.e. M times. M may be e.g. 512, assuming that the possible delay $D_e$ and the response length of hybrid B may together have a maximum of 64 ms, which corresponds to 512 samples at a frequency of 8 kHz. If less than M sampling times are included in the correlation, a new sample of signal SIN is taken in step 61 and the search procedure returns to 57. This loop is repeated until step 60 detects that correlations have been calculated M times, whereafter the procedure passes to step B in FIG. 5B.

Figure 5A:
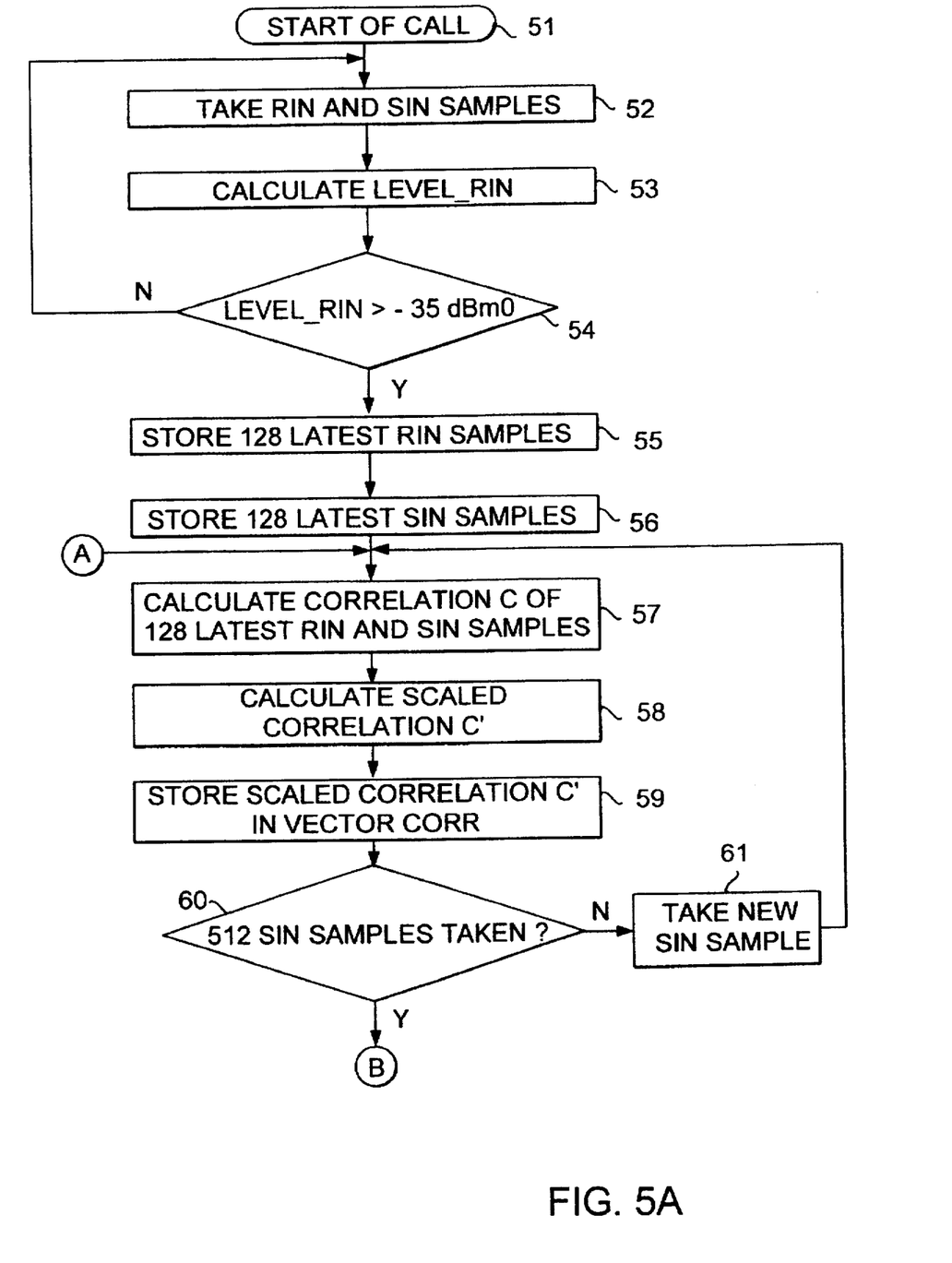
FIGS. 5A and 5B are flow diagrams of the delay location method of the invention.
Figure 5B:
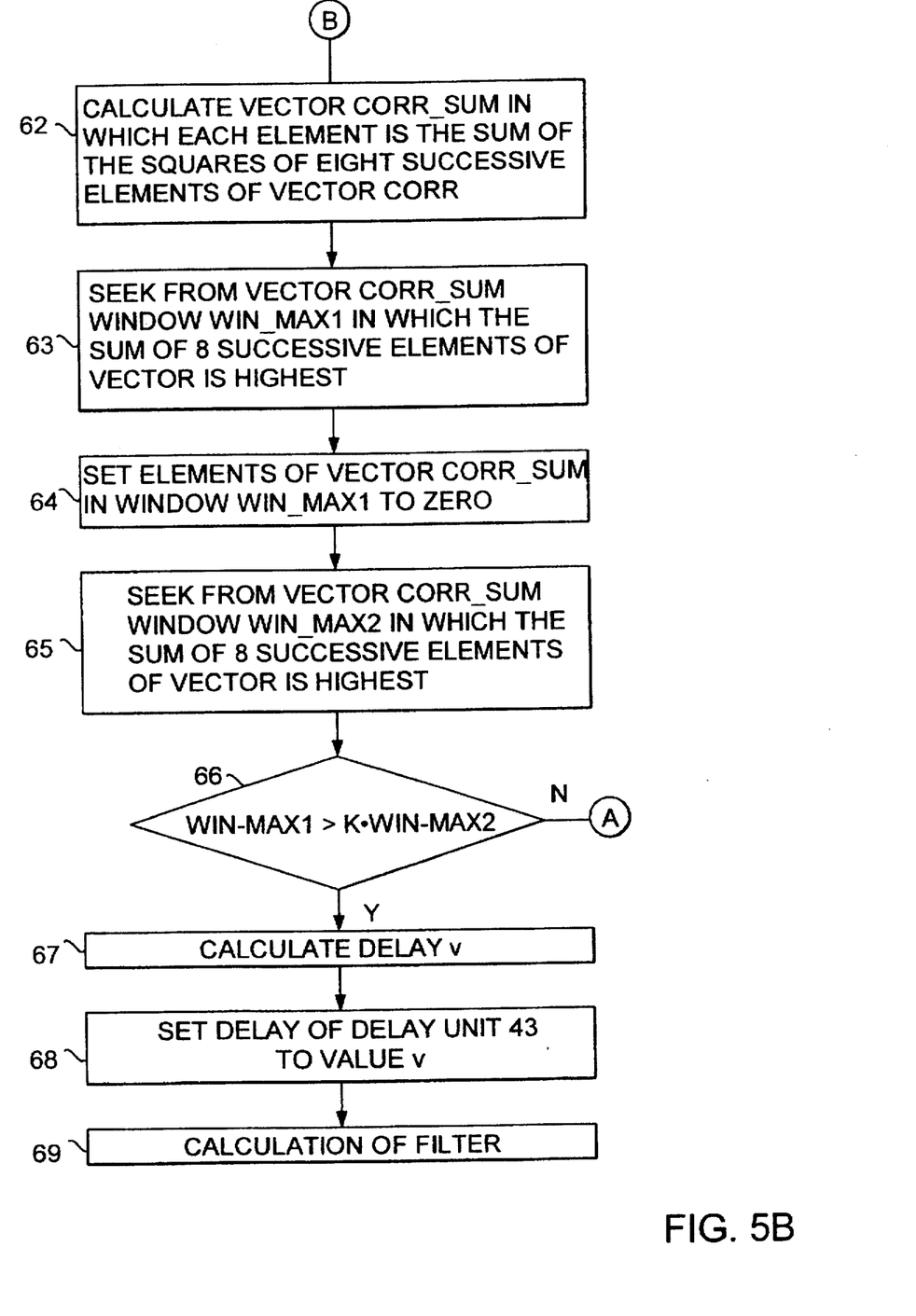

FIG. 5B illustrates the step of analyzing the result given by the search procedure. Since a speech signal is sequential, particularly in voiced sounds, at several points in the speech it will be impossible to locate the delay. For this reason, it is important that the speech analysis determine when the delay location has been found with certainty and when further correlation calculations are required to obtain a correct result.

When the correlation between the signals SIN and RIN has been calculated and stored in vector CORR in accordance with FIG. 5A, said vector thus containing M elements in which the correlation result C' is stored in accordance with equation (5), the analysis of the results is started. First, in step 62 vector CORR_Sum in which each element is the sum of the squares of X elements of vector CORR is calculated in accordance with equation (6). Equation (6) is repeated with integers of i in the range from 1 to M/X. It is preferred that M and X are selected so that M/X is an integer.

$$CORR\_Sum(i) = \sum_{n=X*(i-1)+1}^{X*i} CORR(n)*CORR(n) \qquad (6)$$

where

X is constant, e.g. 8.

Thereafter in step 63 a window Win_Max1 is sought from vector CORR_Sum in which the sum of Y successive elements of vector CORR_Sum is the highest in accordance with equation (7).

$$Win\_Max1 = MAX \left( \sum_{i=n}^{n+Y} CORR\_Sum(i) \right) \qquad (7)$$

where

Y is constant, e.g. 8.

MAX() is a function determining the variable n so that the sum will have the highest possible value.

Once the window Win_Max1 has been determined, the elements of vector CORR_Sum in this window are set to zero in step 64. Thereafter, in step 65 a second window Win_Max2 is calculated in which the sum of Y successive elements of vector CORR_Sum is the highest in accordance with equation (8).

$$Win\_Max2 = MAX \left( \sum_{i=n}^{n+Y} CORR\_Sum(i) \right) \qquad (8)$$

This second window Win_Max2 will have a different location than the first window Win_Max1, since the elements of vector CORR_Sum in window Win_Max1 have been set to zero. In step 66, the values of windows Win_Max1 and Win_Max2 are compared. If the value of window Win_Max1 is sufficiently higher than the value of window Win_Max2, e.g. by coefficient K, it is decided that the sought delay has been found with sufficient certainty. Thus coefficient K defines how readily the determined delay will be accepted, and the integer 2, for instance, can be employed as coefficient K. In practice, window Win_Max1 in vector CORR_Sum contains the center of the impulse response of hybrid B, i.e., of the actual delay range. Since the square of X successive values of vector CORR has been calculated in vector CORR_Sum, the center of the delay in vector CORR is X times the distance from the beginning of the vector. On this basis, in step 67 the delay unit can be provided with a delay value enabling alignment of the center of the hybrid response at the center of the adaptive filter in accordance with formula (9)

$$v = X*l - a/2 \qquad (9)$$

where v = value of delay set in delay unit a = length of adaptive filter (e.g. 128)

l = center of Win_Max1 determined in vector CORR_Sum.

If a value below zero is obtained as the value of delay v in formula (9), v is set to zero. When the calculation circuit 44 has thus determined the delay v, the calculation unit 44 sets the delay of adjustable delay unit 43 to value v in step 68, and thus the center of the window of adaptive filter 40, having a length of N samples, will be at the center of Win_Max1 calculated previously. In a primary embodiment of the invention, a sliding window may be used in the adaptive filter 40 (in other words, the delay of delay unit 43 can be slightly changed) during the call, wherefore it is not necessary to determine the delay $D_e$ with absolute accuracy at this stage. Once the adaptive filter has been aligned at the center of the echo range by the above procedure, normal calculation of the filter coefficients is commenced in step 69 to adapt the filter to the echo path. If in step 66 the value of window Win_Max1 is not sufficiently higher than the value of window Win_Max2, the procedure passes to step 57 according to FIG. 5A, which means that the correlation C of signals SIN and RIN is continued. It is to be noted that the correlations previously calculated remain stored in vector CORR. In other words, when the procedure passes to block 62, all previous correlation calculations are included.

Since the delay search will normally take about 100–300 ms from detection of speech in signal RIN, attenuation is employed in attenuator 42 during the delay search whenever the RIN signal level Level_RIN exceeds the predetermined threshold, e.g. −35 dBm0. The attenuation of attenuator 42 may be e.g. 18 dB. The possible on-time of attenuator 42 is limited to 400 ms, for instance, which prevents faulty operation of the attenuator if the delay is not determined rapidly enough. After the delay search, adaptation of the adaptive filter 40 to the echo signal will take about 100 ms, depending on the speech level and interference; also during this time extra attenuation is employed. Then attenuation can be switched on for instance when Level_RIN>2 * Level_SIN. Also in this case the possible on-time of attenuator 42 is limited to 1.25 seconds, for example.

The figures and the description pertaining thereto are only intended to illustrate the present invention. Various modifications and variations of the invention will suggest themselves to those skilled in the art without, however, departing from the spirit and scope of the invention defined in the appended claims.

The invention claimed is:

1. A method for adaptation to an echo location in an echo canceller comprising an output port, an input port, an adjustable delay unit compensating for the pure delay component in an echo path between the echo location and the output port of the echo canceller, a digital filter calculating, from a signal outgoing to the echo path, an estimate for the echo location which is shorter than the maximum allowed duration of the echo path, characterized in that the method comprises the steps of a) taking N samples of the speech signal outgoing to the echo path, and storing them in memory, b) taking N samples of a signal incoming from the echo path, and storing them in memory, c) determining the correlation between the stored N samples of the outgoing signal and the stored N samples of the incoming signal by calculating a scalar product thereof, d) taking a new sample of the signal incoming from the echo path and deleting from memory the oldest sample, N of the latest samples of the incoming signal being stored, e) repeating steps c) and d) M times, which corresponds to at least to the combined length of the longest allowed time interval of said delay and the actual echo location, f) determining the center of echo on the basis of the calculated correlations, g) determining, on the basis of the calculated correlation values, whether the delay location has been found with sufficient certainty, and if not, returning to step a), h) adjusting the delay of said delay means in such a way that the center of the digital filter is aligned with the center of echo thus determined.

2. A method as in claim 1, characterized in that determining the center of echo comprises the steps of calculating the sums of squares of X successive correlation results, finding among the square sums the highest sum of Y successive values, setting to zero the square sums that made up said highest sum, finding anew the highest sum of Y successive values among the square sums, comparing the first determined and last determined highest sum, if the ratio of the first determined and last determined highest sum is higher than a predetermined threshold value, aligning the center of echo to the location of the correlation results constituting the first determined sum, if the ratio of the first determined and last determined sum is lower than a predetermined threshold value, continuing with the calculation of new correlation results.

3. A method as in claim 1, characterized in that N is 128 and M is 512.

4. A method as in claim 2, characterized in that X is 8 and Y is 8.

5. A method as in claim 1, characterized in that the level of the outgoing signal is measured, and when the level of the outgoing signal exceeds a predetermined threshold value, sampling is commenced.

6. A method as in claim 1, characterized in that the level of the incoming signal is measured and the level of the outgoing signal is attenuated when the level of the incoming signal exceeds a predetermined threshold value during search of the echo location.

7. A method as in claim 1, characterized in that search of the echo location is initiated when information on the start of a call is obtained from a telephone exchange.

* * * * *

UNITED STATES PATENT AND TRADEMARK OFFICE
CERTIFICATE OF CORRECTION

PATENT NO. : 5,737,410
DATED : April 7, 1998
INVENTOR(S) : Vahatalo. et al

It is certified that error appears in the above-identified patent and that said Letters Patent is hereby corrected as shown below:

On the title page: Item [73] Assignee

Please change the assignee's Name to:

-- Nokia Telecommunications Oy --

Signed and Sealed this

Fifth Day of January, 1999

*Attest:*

*Attesting Officer*

*Acting Commissioner of Patents and Trademarks*